United States Patent
Eriksson et al.

(12)

(10) Patent No.: US 6,276,485 B1
(45) Date of Patent: Aug. 21, 2001

(54) DEVICE AT TILLER TRUCK

(75) Inventors: Lars Eriksson, Mantorp; Gert Precenth, Mjolby; Kurt-Ove Stenberg, Gnejsvagen, all of (SE)

(73) Assignee: BT Industries AB (SE)

( * ) Notice: Subject to any disclaimer, the term of this patent is extended or adjusted under 35 U.S.C. 154(b) by 0 days.

(21) Appl. No.: 09/474,599

(22) Filed: Dec. 29, 1999

(30) Foreign Application Priority Data

| Dec. 30, 1998 | (SE) | 9804593 |
|---|---|---|
| Dec. 30, 1998 | (SE) | 9804594 |
| Dec. 30, 1998 | (SE) | 9804595 |
| Dec. 30, 1998 | (SE) | 9804596 |
| Dec. 30, 1998 | (SE) | 9804597 |

(51) Int. Cl.[7] ................................ B62D 1/14
(52) U.S. Cl. ................................ 180/332
(58) Field of Search .......................... 180/332

(56) References Cited

U.S. PATENT DOCUMENTS

| 3,557,893 | * | 1/1971 | Kohls | 180/332 |
|---|---|---|---|---|
| 4,034,823 | * | 7/1977 | Houskamp et al. | 180/332 |
| 4,697,661 | * | 10/1987 | Pajerski et al. | 180/332 |
| 4,709,771 | * | 12/1987 | Basham et al. | 180/332 |
| 5,384,765 |  | 1/1995 | Sakagami et al | 370/13 |
| 5,595,259 | * | 1/1997 | Gilliland et al. | 180/332 |

FOREIGN PATENT DOCUMENTS

| 0618681 | 10/1994 | (EP) | H03K/19/018 |
|---|---|---|---|
| 2315717 | 2/1998 | (GB) | B62D/51/00 |

* cited by examiner

Primary Examiner—Kenneth R. Rice
(74) Attorney, Agent, or Firm—Hayes, Soloway, Hennessey, Grossman & Hage, PC

(57) ABSTRACT

Arrangement at tiller truck, at which the communication between the handle and the truck itself is done via a serial connection, for instance a serial cable (31) between a logic unit in the handle and a logic unit in the truck itself. A drive control (7, 8) includes a number of Hall-sensors (19) that are successively activated by a magnet (17) that is in turn mechanically activated, so that via a logic circuit a varied drive current is fed to the drive motor. The Hall-sensors (18) are arranged on a circuit card 19 that also include logic circuits.

A safety control (belly button) (9) that is arranged on the handle. If the belly button is depressed this is on an inward protruding arm (21) provided with a magnet 22 that at this movement is moved so that it will influence one or several Hall elements belonging to the drive control (7, 8), at which however the magnet (22) is on the other side of a circuit card (20) that carries the Hall elements. The logic of the circuit card is programmed to activate an anti squeeze operation where the truck moves away from the driver until the button has been released and has returned to its initial position.

On the bottom side of the handle a key board (14) is arranged for authentication and starting and stopping of the truck instead of with a key.

39 Claims, 3 Drawing Sheets

DEVICE AT TILLER TRUCK

Tiller trucks are today provided with more and more functions and possibilities, which in many cases mean additional controls arranged in the tiller handle. This means that an increasing number of cables run from the handle via the hinged and pivotable tiller to the truck itself. Since this is a comparatively long distance there is a risk that signals and pulses in one lead induce pulses in other leads, that may be sufficiently powerful to give faulty signals to the truck. This is of course not acceptable and the separate leads are therefor shielded or encapsulated in order partly to prevent internal influences and partly to prevent influence from other sources, as for instance from leads to motor and battery, that due to the large currents can result in powerful magnetic induction fields.

Shielded leads means in turn increased costs and the resulting thick cable is further more difficult to guide from the moveable arm to the truck itself, which may mean an increased risk of damages to the cable and partial function drop outs and security risks. In view of the above problems a first object of the invention is to eliminate the above drawbacks so that a safer and to a lower cost manufacturable truck is obtained.

The above object is solved by the use of digital serial communication between the handle and the truck itself. Preferably the digital communication is arranged in the shape of a serial cable. In order to handle the transfer digital circuits are arranged in the handle, for instance for the transfer of given control orders from the controls to signals that are then transferred to another digital unit in the truck itself that interpret the delivered digital signals and deliver corresponding commands to for instance thyristors and hydraulic valves.

At a first look the solution according to the invention seem to result in an unnecessarily increased complexity and probable increase in cost, in reality however it is an essential simplification and cost reduction.

The communication can preferably be by means of a cable but one can also consider wireless transfer via radio or optically, which in itself may provide additional supervising possibilities if so desired.

If one further as, is suggested in accordance with a further development of the inventive thought, locate the logic unit in the tiller handle and let it take care of other digital functions of the truck also additional advantages may be achieved. For instance means for authority verification may be located in the handle, and furthermore contact free sensors that are practically impossible to wear out may be used for the controls of the handle.

The arranging of logic circuits in the handle further allows an entirely digital speed control consisting of separate contact-free sensors instead of a potentiometer or the like. In this way the wear resistance and invariability during the time of use can be improved further, at the same time as the controls more optimally may be adapted to the digital logic.

The logic unit in the truck itself need only to have a communication function. The communication may further be bi-directional to allow sensors in the truck itself to send its information to the logic unit in the handle.

An additional advantage achieved with the locating of the logic in the handle is that the shocks and vibrations, including for circuit cards harmful microvibrations that are easily transferred to the truck from its comparatively small and hard wheels do not get the same possibility to reach the logic circuits.

The logic unit may further together with buttons and controls constitute a unit that is removable from the handle with a connection for the cable that connects the unit with the truck. Since this cable can be arranged inside a beam constituting the tiller it becomes comparatively well protected and since it is not a multiconductor cable it will be simpler to arrange.

For the shielding of the logic unit from sources of disturbances the handle may include a shielded space for the logic circuits.

In the cases when a display is desired this can be mounted more or less directly at the logic unit or even appended to this, that can be constituted of a separate unit in the shape of a circuit card.

Even a possible set of buttons or a keyboard for authority verification may be arranged in direct proximity at the logic unit or as a part thereof at for instance the bottom of the handle.

At trucks, for instance tiller trucks, today generally a more or less electronic drive or travel control is used to control travel direction and speed. The driving force is controlled by means of a potentiometer coupled to the control electronics. This brings the advantage of small control currents and good precision in the control. A drawback is however that potentiometers with necessity are worn reducing the precision and even bad contact may occur, resulting in a jerky increase or travel and the risk of dropping the load. To this comes of course the work with changing potentiometer including mounting and dismounting electrically as well as mechanically. There is also a risk that the potentiometer is subjected to moisture impairing its function and reducing it life, this in particular as many trucks of this kind alternatingly are indoors and outdoors with the consequent risk of condensation, not to mention the risk of rain.

In view of the above problems a second object of the invention is to provide a drive control that do not have the above drawbacks. In accordance with the invention the problem is solved with a drive control that includes a number of after each other activatable contact free sensors or switches, that are successively activated in order to via a control circuit feed a varying driving current to the driving motor. Initially this may seem as a step backward. Since with modern technique the switches or sensors can be made contact free and thereby wear free and uninfluenceable it is however a step forward and an essential difference relative the known technique.

Since the sensors are contact-free the mechanical manoeuvering part of the control can be contactwise or mechanically entirely free from the sensor part that therefor can be substituted without the mechanical maneuvering part having to be dismounted and vice versa.

Since the drive control also is to take care of the direction of travel this is at the invention simply solved by different series of sensors controlling travel forwards respectively backwards. This simple solution also minimizes the risk of errors.

An advantageous way to shape the drive control in accordance with the invention is to mount a magnet in the movable part of the control that at the turning or pushing movement of the control is brought past a number of Hall-elements that are used as sensors. By arranging a sufficient number of Hall-elements the control movement can be divided into the required number of steps that are required to make the adjustment of the speed sufficiently adaptable to the travel speed of the operator. If so is desired the number of sensors can be reduced or smaller steps be achieved by using both the front and rear slope of the sensor signals.

In relation to the normal use of potentiometers for the defining of the driving force at the invention a signal also at the 0-position can be obtained as a receipt if so desired.

If a stepless increase for the driving force is desired so that this will not be experienced as jerky this can surprisingly enough be achieved despite the use of discrete elements. The electronics can achieve a ramped or successive increase. By adapting the ramping to the speed between the sensors no delay is felt at rapid increases nor surprising increase jerks at slow movements. The ramping can also be used to bridge jerk free faulty separate sensors. When the position of the control change from a position it has had for a long time it can be difficult to know the speed of the control movement and then a standard value may be used instead, while when later an additional sensor is passed the electronics has the possibility to register the time and provide a suitable ramping based on the sped of the control movement.

An alternative to the use of Hall-elements is to use a light emitting diode that deliver light to a moveable light conductor or prism connected to the speed control, that leads the light further to a ladder of photodiodes or -transistors that are successively activated.

The use of Hall-elements allows the mounting of these on a circuit card carrying the logic unit, and which printed circuit can be entirely and efficiently encapsulated. The drive controls are journaled directly in the handle or in a particular on this mountable control panel and includes a magnet for the activation of the Hall-sensors.

Since the manoeuvering parts are free from electrical components they will be easy to manufacture and service.

At tiller trucks, in order to secure that the operator is not squeezed between the tiller and a wall, pallet shelves or other object a so called belly-button or safety control is arranged centrally on the handle and slightly protruding towards the operator. If the button is depressed the truck immediately begins to drive away from the operator. Normally this button is not used and it is impossible to be certain that the operator regularly test if the button works or not. In particular if the truck is used outdoors or alternatingly indoors and outdoors the contacts may in particular without regular use oxidize with resulting malfunction. It is of course possible to prescribe a repeated testing but it is not certain that this is always done.

In view of the above problem a third object of the invention is to provide an increased security in the function of the belly-button of tiller trucks at the same time as the cost is reduced. In accordance with the invention this object is solved by arranging the safety button so that it influences switches or sensors separately or in combination that belong to other controls, and in particular such that are regularly used.

In a further development of the inventive thought the safety button and the speed control are arranged with one or several sensors or switches in common. The speed control can for instance include several switches (or sensors 9) that each correspond to a specific drive current (like a staircase). Activation of the speed control activate only a limited number of these switches at a time. When the safety button is activated (pushed in) an extra activation of one or several sensors take place. This sensor or sensors are, chosen in such a way that a logic unit connected to the sensors immediately detect that the safety button has been depressed and based hereon activate a preprogrammed safety procedure including for instance driving the truck away from the operator.

For instance the safety button may influence some of the switches or sensors that correspond to a driving away from the operator, for instance the one that corresponds to the second fastest speed away from the operator, that is in the direction of the forks.

In other words switches or sensors will be used for the safety button that are frequently used and therefor do not risk to be destroyed through oxidation. Mechanically the safety button is not worn at all since it is normally not used but remain mechanically as good as new.

In an advantageous version of the invention fixedly mounted Hall-sensors are used for the speed control in combination with a moveable magnet that in a pivoting movement is brought past the sensors. The safety button is then provided with one or several magnets that on the depression of the button enter into the reaction area of one or several Hall sensors belonging to the speed control. Since no contacts exist a very safe function of the belly or safety button is achieved.

When the safety control is freed through the movement of the truck away from the operator the logic may if so is desired require that the speed control must return to zero position, possibly even for a certain time before driving toward the operator may take place again. During the waiting time the brake of the truck may be activated in order to prevent the truck from freewheeling towards the operator if the truck stands on an inclined surface.

Since the sensor elements that belong to the speed control are in constant use the logic can comparatively simply continuously monitor that they function since the sensors are passed in succession after one another in a repeated or reversed order at increase or decrease. The logic can thus monitor if this order is followed and if some sensor suddenly is passed without activation it is not functioning. At a first look it may seem that this monitoring easily will become unsatisfactorily if the sensor or the sensors that can be influenced by the safety button correspond to high speed deflections of the speed control and therefor not will be influenced at each movement. In reality however full speed is the most usual position of the control at driving and a check will therefor sufficiently often be carried out giving a satisfactory security. Should a malfunction be registered for precisely that or those sensors that are used also for the safety button preferably continued driving is prevented or this may only take place with essential limitations at least for movements towards the operator.

One can also consider to arrange two magnets so that activation takes place at two locations of different Hall elements which is recognized by the logic on the circuit card as an order to drive the truck away from the operator.

In order to make it possible with authority verification at tiller trucks it is desirable with a keyboard where the user can enter a pin code. This may of course be arranged on the top of the machine, but will then have an exposed position were it may easily be damaged. On machines with few functions and thus controls one could consider to place the key board on the upper side of the handle, but on machines with many functions this is not possible since the controls take all available space. Since one further wishes to have as few base versions of the handle as possible this is not realistic and furthermore the interest in authority verification is the greatest at the machines that have many functions and thereby the possibility of making mistakes increases at the same time as the location area lessens.

A fourth object of the invention is to solve the above problem so that an easily accessible key board for authority verification is obtained. This object is solved by arranging the key board on the bottom side of the handle. Normally no competing controls or anything else exist here that can prevent the arranging of the keyboard. At the first look this location may seem entirely unsuitable and unfriendly for the user, but since the keyboard is only used initially before a period of use and not during use and in particular since the tiller when the machine is unused is spring pretensioned towards an upright position, the keyboard will before the machine is to be used have the keyboard facing the user and this even in an easily manageable height level.

The arranging of the key board on the bottom side of the handle further brings the advantage that it will be far more protected than if it is on the machine on the upper side of the handle. On the upper side falling goods or cradles can damage the keyboard that may be considerably more sensitive than the other controls.

The tiller of the truck is in its resting position due to the spring pretension straight up with the bottom side of the handle turned towards the operator and sufficiently high up to be comfortable to reach. Since the handle in its upright position is spring loaded and pulled against a mechanical stop there is no risk that the handle moves at the use of the keys. It is therefor quite natural for the operator to enter his code in this position and then to take the handle and start to use the truck.

Since trucks are often used by different persons and for different types of work it is sometimes reasonable to adapt the truck to different circumstances and persons, for instance by changing maximum travel speed, lifting speed etc, high loads must be handled more carefully and slower by unexperienced operators that also have to drive slower, which is also the case on uneven ground. In order to make these reprogrammings of the truck it is known to provide the truck with connection means for the connecting to outer means, that for instance can be constituted by a computer. It is also known to provide trucks with special controls for the programming. The possibility to program however means an additional cost. For larger trucks this is no problem since they can take the cost for the required extra equipment. This is however not the case for smaller trucks where the cost hunt is a hindrance for these in themselves desirable possibilities. It is conceivable to have the additional equipment in the shape of feed equipment or card reading equipment, that is only added on certain machines. This however leads to unreasonable costs for these machines and means also that it becomes difficult or impossible to refurnish unequipped machines. In other words today a satisfactory solution for smaller machines as for instance tiller trucks is missing.

A fifth object of the invention is to find a solution to the above problem. The solution in accordance with the invention is that no extra equipment at all is mounted, but possibly a display that is often required for other reasons and that may be very simple. For the programming controls are used that all trucks are equipped with anyhow. Preferably the control for the signal and the drive control are chosen since these controls always exist when it is the question of an electrically driven truck. In this way a total of three different signals to the electronic of the truck is obtained since the speed or drive control has signals both for forward and backward movement.

With the invention it is at tiller trucks possible to browse the parameter settings and change those that are to be changed. The parameters and their settings can be indicated by a simple code on a simple but well observable display on the truck handle. Since controls are used that are there anyhow the cost increase if any will be a minimum.

By the invention also trucks that originally lack possibilities for reprogramming can be furnished with this. Since further the cost for the electronic that is required to enable reprogramming is very small the additional cost will be low and it is consequently easy to vary the equipment of the truck and to refurnish it at a later upgrading.

Since the entering into the program mode or parameter setting of the truck by mistake is unwanted the machine should preferably have two distinct separate work modes, one for use and one for programming, where shifting can not take place with less than the truck being shut off. In this way it becomes impossible to slip over from working mode to programming mode or vice versa.

In order to enter the programming mode for instance the signal control can be depressed at the same time as the key is turned for the truck. In order to start the truck for work one can simply avoid depressing the signal control (button).

In particular for the case that the logic unit of the truck is located in the handle as well as the display the total cost can be kept low since the display can be arranged more or less directly in the proximity of the logic card.

At the use of discrete sensor elements for drive control a sensor can be chosen corresponding to a certain speed forward stepping forward and another corresponding certain speed for the sensing (in this mode) so that a sufficient distance is obtained as well as a simple provision of signals to the electronic when this is in a programming mode Within the word programming mode not only the setting of different parameters but also function control and error searching can be included, as well as any settings or checking that is done via electronics. Likewise the programming mode can be divided into several different modes, alternatively one can conceive that the truck apart from the work mode has several programming or electronically accessible modes, as for instance one mode for an error log.

BRIEF DESCRIPTION OF DRAWINGS

Additional advantages and characteristics of the invention are apparent from the following description of an embodiment shown in the enclosed drawings. In these

DETAILED DESCRIPTION OF DRAWINGS

Figure 1:
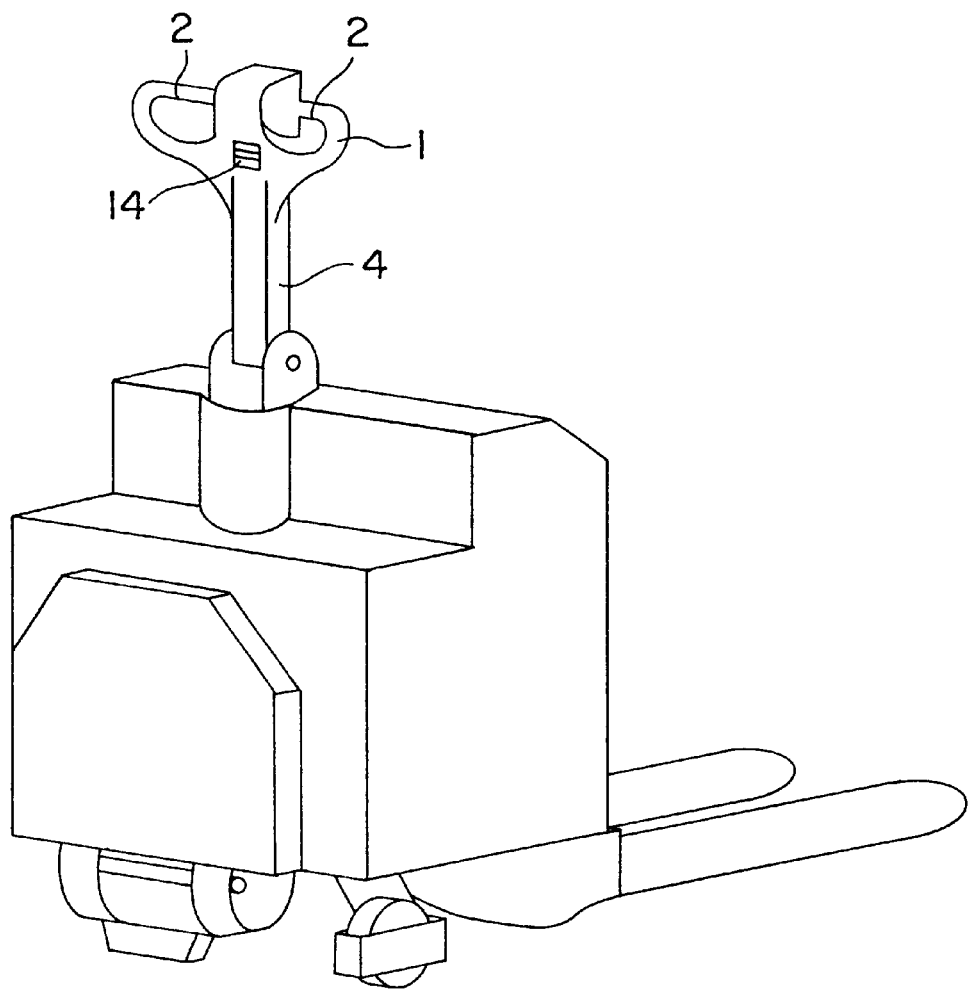
FIG. 1 shows a tiller truck in its entirety, FIG. 2 its handle seen from above, FIGS. 3 and 4 vertical longitudinal sections through the handle and FIG. 5 one of the speed controls.

The tiller truck shown in FIG. 1 includes a drive and power unit from which the load forks project. In the drive and power unit the large batteries of the truck are arranged as well as a driving and steering wheel that is driven by a motor that is fed with electricity via a chopper that for instance provide currents in the shape of short pulses via tyristors. In the drive and power unit a hydraulic pump is provided with its electrically driven motor and hydraulic valves for the lifting movements. With the driving and steering wheel a tiller 4 is further connected, that is hinged height wise but pivotable together with the wheel in the drive and power unit for steering of the truck. In the outer end of the tiller a tiller handle is fastened and normally the operator leads the truck behind himself or steers it in front of himself.

The handle contains a supporting structure 1 provided with two grip handles 2 and is by means of bolts 3 fastened to the tiller 4 of the truck. On the frame 1 of the handle a control panel is fastened with four screws 6. The panel 5 is provided with drive controls 7 and 8 for left and right hand respectively for control of travel direction and speed by turning.

The control panel further includes a safety control or belly-button 9, a control 10 for lifting and lowering of the forks, a control 11 for lifting and lowering of the support legs and two buttons for the horn, one for the left and one for the right hand. On the top side the handle is further provided a display 13 and on the bottom side there is keyboard 14 for authority verification.

Figure 5:
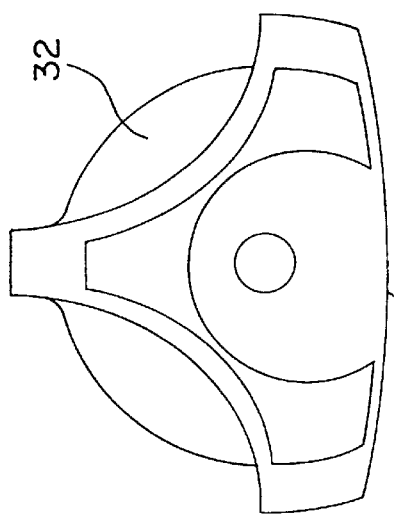
Figure 2:
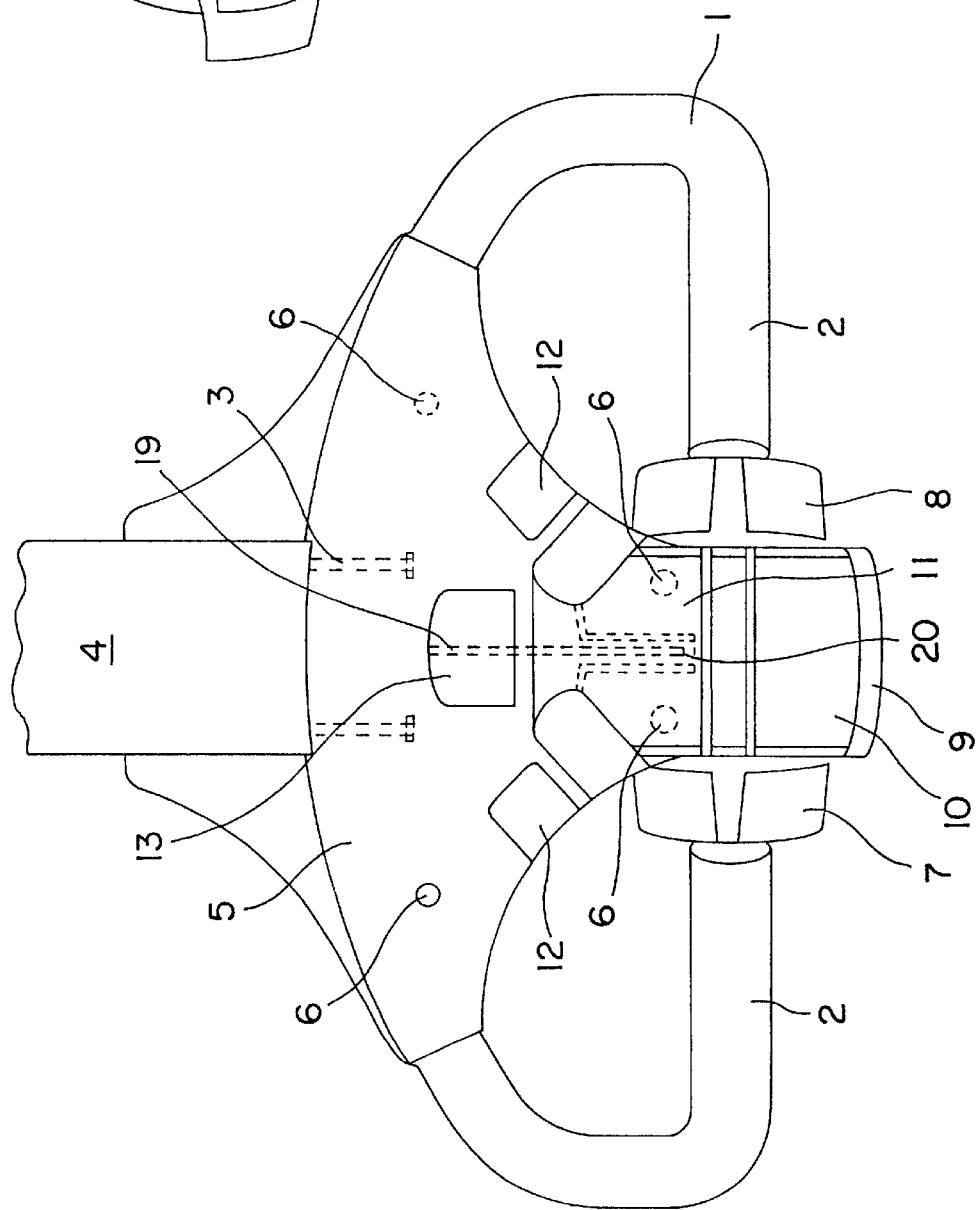
Figure 3:
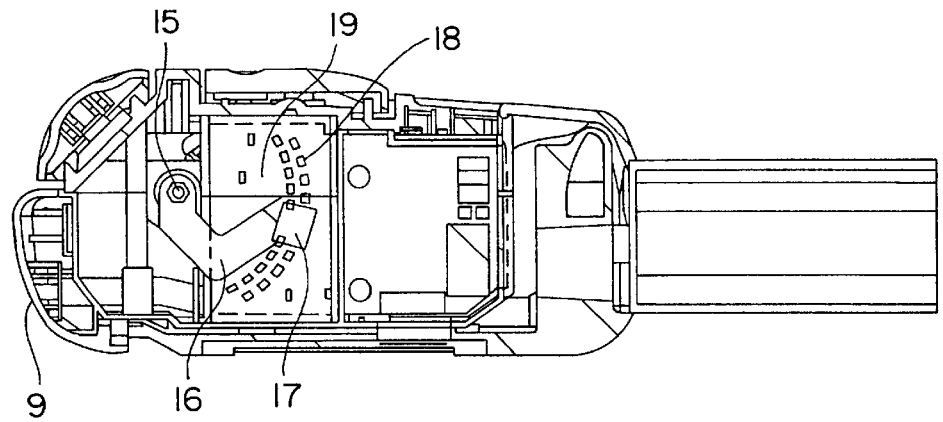
Figure 4:
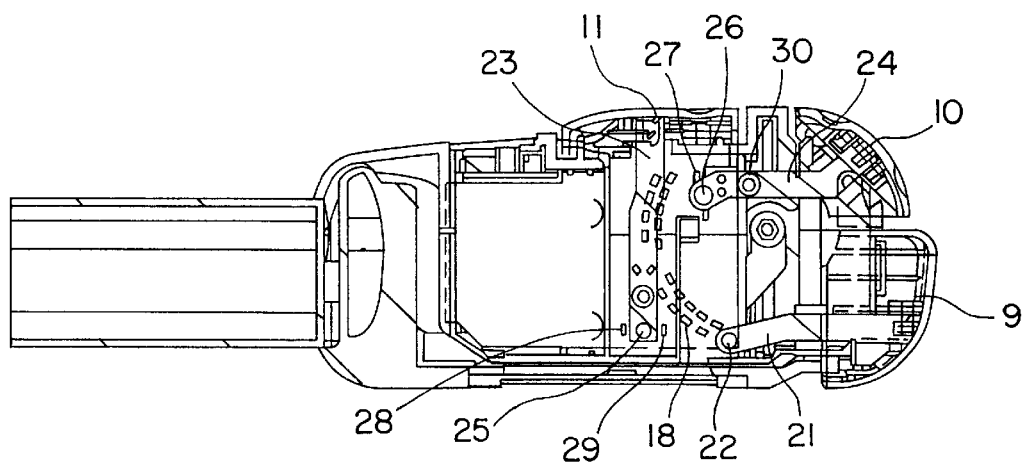

The drive controls 7 and 8 has the shape that is shown in FIG. 5 and differ from conventional drive controls by a downwards facing only slightly curved side 31. The operator can when he walks forwards with the truck following after him turn the palm of the hand upwards with the index finger in contact with the downwards facing only slightly curved side of the control, while the thumb may grip into the upper recess 32 turned towards the operator. In this way the ergonomics and the possibility of the operator to vary the manner in which the drive controls are actuated improve, so that the comfort is increased at the same time as the risk of wear damages is reduced.

The drive controls 8 and 7 for right and left hand respectively are connected to an axle 15 journaled in a lower bowl shaped part of the control panel 5. On the axle 15 an arm 16 is arranged provided with a magnet 17 in the outer end. At actuation of one of the drive controls 7 or 8 this magnet 17 is swung upwards or downwards from the neutral rest position dependent on desired direction of movement and speed respectively. The magnet that moves in a vertical plane at this sweeps along a curved double path of separate Hall sensors 18 arranged on a printed circuit 19. Via a serial cable 31 the printed circuit card is in contact with the drive and power unit of the truck. The printed circuit card is in the proximity of the speed control arranged in a narrow vertical receiving space or slot 20 in the bottom part of the housing and is in this way well protected, while the magnet moves on the outside of the slit wall, the magnet or any of the other moveable parts can thus not harm the Hall sensors or the printed circuit card even at greater play. The magnet field however has no difficulty in reaching through the walls of the receptacle and influence the Hall-elements. The Hall elements 18 serve as sensors or switches and the further forward (towards the truck) arranged logic is programmed so that it via the serial cable 31 and an electronically controlled chopper between battery and drive motor can control a successive increasing feed of more drive power at increased deflection of the drive control. The axle is further influenced by a spring device that when uninfluenced return the speed control to its 0-position. Since the Hall sensors 18 are arranged in double rows a large number of individual control levels are obtained (nine in each direction).

Through the used sensor technique the possibility is obtained to have many regulator steps at a low cost and it is easy to adapt the truck speed to the walking velocity of individual operators. In order to allow sufficient precision of the speed steps at low speed the steps are smaller at low speeds than those at the higher speeds. In order additionally to eliminate the feeling of jerkiness at the turning of the drive control the electronics is programmed to give a stepless increase, which is obtained by a successive and stepless increase to this value as the control is turned to the next step. By letting the rapidity in this successive and stepless increase be controlled by how swift the control movement is the sense of sluggishness that otherwise might be felt at increase is avoided. At a swift increase the ramping will be steep and no delay is felt and at a slow increase the ramping is slow so that the operator is not surprised by any sudden increase in velocity. This adaptive ramping may to its inclination be controlled by the time that passes between the activation of the different sensors at increase and decrease. Although this leads to a delay corresponding to the time between the reaction of these sensors this time is entirely negligible in relation to the slowness of the truck due to its weight.

As an alternative to the above use of Hall-elements for contact free control one can consider the use of photosensitive elements together with light guides or reflectors and light emitting diodes or some other light source.

The belly or security button has as its purpose to prevent the operator from being squeezed between the truck and a wall. Should this occur and the belly button is pushed in this is on an inwardly extending arm 21 provided with a magnet 22 that at this movement is moved so that it will influence one or several of the Hall elements that belong to the speed control, the magnet 22 however being located on the other side of the circuit card and its respective slot in relation to the magnet of the speed control. The magnet is as is apparent in level with the Hall-element that corresponds to the next fastest speed away from the operator, that is movement in the fork direction. The logic of the printed circuit card is at this programmed to activate an anti squeeze operation where the truck moves away from the operator until the button is released and has returned to its initial position.

The logic is further so programmed that if it detects a sensor fault that could mean that the sensor or sensors that are to react on a pushing of the belly-button might be non-functioning further use is blocked, or only allowed with limitations, as for instance that the truck can only be driven with a reduced speed and/or that the truck can not be driven towards the operator.

Also the controls located on top of the handle are provided with arms 23, 24 and magnets 25, 26 so that a tilting movement result in Hall-elements 27–30 being influenced initiating movements up and down for forks and support legs respectively.

For the above listed controls the use of Hall elements on the printed circuit card is particularly simple to arrange since the controls are located centrally in the handle in the same manner as the printed circuit card. If so desired one could consider also to arrange the signal controls with an extension and a magnet for a corresponding activation but in the shown case the signal controls are conventional electric contacts and connected by means of electric leads. Since the sensors belonging to the different movement controls are constituted by Hall elements sitting directly on the printed circuit card the possibility of electromagnetic pulses coming from the outside to interfere will become very small since the leads are short and centrally placed and also can be metal enclosed.

The slot or channel 20 receiving the printed circuit card 19 in the panel housing is narrow where the Hall sensors are situated to allow magnet influence for respective control but is widened in the end facing the truck. In this wider end the capsules containing the processors, memories etc are arranged, as well as the connections to the serial cable 31, keyboard and display.

The display 13 arranged on top of the control panel 5 is connected to the printed circuit card 19. The display is used at malfunction control and parameter setting without external means or additionally on the truck arranged means, but solely with the controls that the truck is normally provided with. In order to conduct an error control or parameter setting respectively one of the signal buttons is depressed at the same time as the truck is turned on via the authority verification described in more detail below alternatively with a key. This result in the logic of the truck entering into what we could call a check mode with all working functions inactive. An E is shown on the display corresponding to an Error log mode. A continued depressing result in the display of a P corresponding to parameter setting mode and a releasing of the signal button causes it to stay in the shown mode.

In the E-mode after a releasing of the signal button the latest error or malfunction that has been registered is displayed in the form of an error code alternating with the time (drive time) at which the error occurred. By means of the speed control one can then move back and forward in time with error codes and corresponding times being displayed. To get out of the error log mode the truck is turned off.

If by a somewhat longer depression of the signal button a P is shown on the display and the button is released at this the parameter setting mode has been entered and by actuation of the drive control corresponding to movement from or against the operator the display moves up or down in the list of parameters. When the parameter that is to be altered has been reached in this way the signal button is depressed resulting in the display of the parameter value, which can be altered up or down by means of the drive control. When the desired value has been reached this is confirmed by a depressing of the signal button, whereafter with the drive control the next parameter that is to be changed can be chosen. In order to exit the parameter setting mode the truck is turned off.

Examples of parameters etc that may be adjusted are allowed acceleration and retardation, height and load limitations, what one wants to receive warnings about, as battery voltage, load weight, height indication, if the indication is to be in kilograms, pounds, meters, feet etc.

The shift back from the error mode or parameter setting mode to drive mode is by turning the machine off. By not depressing any of the signal buttons at the starting the machine starts in drive mode with the possibly new parameter settings.

As is realized a possible change of the number of modes includes only changes in the electronics and a possible increase in the number of modes and check possibilities can thus be achieved with small costs, whether it is a question of further developments in production or refurnishing of a truck.

On the bottom side of the handle a keyboard is arranged for authority verification and starting and turning off of the truck instead of by means of a key. The keyboard is connected to the printed circuit card and arranged on the bottom of the housing of the control panel bottom part. The chassis of the handle is here provided with a corresponding recess so that the keys can be actuated. In this way the keyboard will at the same time be recessed and well protected by the sturdy chassis. The key board includes figure keys and a green key for start and a red key for stopping. If one wishes to enter Error log Mode, parameter setting mode or some other mode where the truck is inactivated one of the signal buttons is depressed at the same time as the green button is depressed or after entered authority verification code. The signal buttons are easy to reach even with the handle turned upward since they are located on the side of the control panel.

The keys of the keyboard may be provided with light emitting diodes that are lit when they have been depressed so that a receipt is obtained for the depressing, alternatively a row of light emitting diodes may be used as confirmation. The keys may be so called touch-keys or membrane keys.

The invention is not limited to the above embodiment but may be varied within the frame of the inventive thought.

What is claimed is:

1. Arrangement at tiller truck, characterized in that the communication between a handle of the tiller and the truck in itself takes place via a serial connection, for instance a serial cable between a logic unit in the handle and a logic unit in the truck itself.

2. Arrangement at a tiller truck in accordance with claim 1 and of the type that includes logic circuits for the control of one or several of the functions of the truck, characterized in that the logic circuits for the truck are gathered in the logic unit arranged in the tiller handle.

3. Arrangement according to claim 1, characterized in that the logic unit in the handle together with one or several controls and or keys are united to a control panel removable from the handle.

4. Arrangement according to claim 1, characterized in that one or several of the controls cooperate with contact free sensors for instance capacitive, optical, inductive or magnet field sensors arranged on a circuit card including logic circuits.

5. Arrangement according to claim 4, characterized in the sensors of the controls including Hall sensors influenceable by magnets connected to the maneuver parts of the controls.

6. Arrangement according to claim 4, characterized in that one or several rows of sensors are arranged successively to be activated by the maneuver part of a speed control and that the logic unit is programmed to control the drive with respect to direction and speed dependent on the signals from the sensors.

7. Arrangement according to claim 6, characterized in that a safety control is arranged on the handle and that the logic is programmed to activate a driving away from the driver at depression, to prevent him from being squeezed against a wall or the like, the safety control being provided with means to influence one or several of the sensors of the drive control, for instance corresponding to movement away from the driver and that the logic further is programmed to detect the depression of the safety control and that the logic further is programmed to supervise the function of the sensor or sensors that are used by the safety control via the use of the drive control and to activate suitable or prescribed measures at a malfunction.

8. Arrangement according to claim 5, characterized in that logic unit is programmed to inactivate drive and instead activate a disgnose or setting program if the truck is turned on with a simultaneously depressed signal control, and that influence of signal control and drive control respectively is used for browsing and/setting together with a display, preferably arranged on the top side of the handle.

9. Arrangement according to claim 1, characterized in that a keyboard is arranged in the proximity of the logic unit, in particular on the bottom side of the handle, for instance for authentication.

10. Control device for truck for instance drive control or the like where several power steps are desired, characterized in that a number of contact free electronic switches, sensors or the like successively are activated or influenced in order to provide a varying drive current to the drive motor.

11. Control device according to claim 10, characterized in that Hall elements are used as contact free electronic sensors, which Hall elements are activated by a magnet mounted in the mechanical maneuvering part of the control.

12. Control device according to claim 10, characterized in that photosensitive elements are used together with a light emitting diode or the like and a light guiding element for the contact free switch between the sensors of discrete steps.

13. Control device according to claims 10, characterized in that an overlap between the reaction areas of neighboring sensors are used to achieve intermediate control steps.

14. Control device according to claim 10 characterized in that the electronic switch or sensor elements are arranged on a circuit card that also include logic circuits.

15. Control device according to claim 10, characterized in that a so called belly button or safety control also include means for influencing one or several of the contact fee sensors belonging to the drive control so that the same sensors can be used also for this function.

16. Control device according to claim 10, characterized in that one sensor element corresponding to a movement towards the operator, and a sensor element corresponding to movement away from the operator via a logic unit is used for a stepping forward or rearward at parameter setting.

17. Control device according to claim 10, characterized in that it is adapted or programmed to achieve a stepless transition or ramping between different sensors corresponding increase steps, at which the time for the change between the different power steps corresponds to or is proportional to the time between the different sensor positions, so that a rapid control movement result in a rapid ramping while a slow movement result in a slower ramping.

18. Device at a safety control in the handle of a tiller truck, which control is mounted so that it at normal use is turned towards the operator and that at depression it initiates the driving of the truck away from the operator in order to eliminate the risk of the operator being squeezed against an obstacle, wall or the like behind him, characterized in that the safety control at activation influence one or several to a logic unit connected switches or sensors that are also used by a second control.

19. Device according to claims 18, characterized in that the second control is the drive control and that the sensor or sensors that may be used by the safety control corresponds in the drive control to a driving away from the operator and that the device is programmed to initiate driving away from the operator independent of the position of the drive control when the safety button is activated.

20. Device according to claim 18, characterized in that the function of the switches or sensors that is used by the safety control is monitored by the logic unit in such a way that if the speed control during its normal use passes the switch or sensor or switches or sensors that are also used for the safety control on each side without activation of the intermediate sensor continued driving is prevented, an error signal is delivered and/or drive limitations are imposed.

21. Device according to claims 18, characterized in that the safety control can simultaneously influence two or more switches or sensors so located that the other control can not influence both at the same time and that the occurrence of the two or several sensors activated at the same time initiates a driving away of the truck from the operator.

22. Device according to claim 18, characterized in that the sensors are arranged on a circuit card together with a logic unit.

23. Device according to claim 18, characterized in that the sensors are contact free.

24. Device according to claim 18, characterized in that the sensors are Hall sensors and that the safety control and the other control or controls include magnets moveable each on one side of the Hall sensors.

25. Device at a tiller truck, in particular a safety device, characterized in that it includes a keyboard for authority verification arranged on the bottom side of the handle.

26. Device according to claim 25, characterized in that the keyboard is somewhat recessed into the handle so that it becomes better protected.

27. Device according to claim 25, characterized in that the keyboard is arranged in the proximity of a logic unit for the truck arranged in the handle.

28. Device according to claim 25, characterized in the that the keys of the keyboard includes light emitting diodes for confirmation that key depression has taken place.

29. Device according to claim 25, characterized in that the keys are touch keys or membrane keys.

30. Device according to claims 25, characterized in that the keyboard includes start and stop keys.

31. Method for parameter setting at a truck, in particular tiller truck, characterized in that the truck in addition to a work mode has at least one check and/or programming mode in which truck controls that are used in the work mode are used for checking, programming or setting of parameters.

32. Method according to claim 31, characterized in that the work functions are inhibited when it is in programming mode.

33. Method according to claim 31, characterized in that the drive control and the signal control are used in the programming mode.

34. Method according to claim 33, characterized in that both activation directions of the drive control is used in the programming mode.

35. Method according to claim 31, characterized in that the switch between programming mode and work mode is by the truck being shut off.

36. Method according to claims 31, characterized in that the programming mode is switched on by the signal control being activated at the same time as the truck is switched on.

37. Device for the executing of the method in claim 31, characterized in that the truck is programmed to have in addition to a work mode at least one programming mode in which the truck controls that are used in the work mode are programmed to be used for programming or setting instead.

38. Device according to claim 37, characterized in that a display is arranged in the handle for the showing of for instance codes, and/or parameter values and that the logic circuit of the truck is arranged in the handle, preferably with the display in direct proximity thereof.

39. Device according to claim 37, characterized in that the drive control include discrete sensor elements, in particular contact free, and that two of these, in particular one corresponding to movement away from the operator and one corresponding to movement towards the operator when in programming mode are coupled or programmed for instance for a stepping forward and rearward respectively of parameter values.

* * * * *